US007024230B2

(12) United States Patent
Curtiss et al.

(10) Patent No.: US 7,024,230 B2
(45) Date of Patent: Apr. 4, 2006

(54) ACCESSORY INTERFACE SYSTEM

(75) Inventors: Troy Curtiss, Erie, CO (US); Brad Lemley, Lafayette, CO (US)

(73) Assignee: Kyocera-Wireless Corp, San Diego, CA (US)

(*) Notice: Subject to any disclaimer, the term of this patent is extended or adjusted under 35 U.S.C. 154(b) by 326 days.

(21) Appl. No.: 10/080,425

(22) Filed: Feb. 22, 2002

(65) Prior Publication Data

US 2003/0162497 A1  Aug. 28, 2003

(51) Int. Cl.
*H04B 1/38* (2006.01)

(52) U.S. Cl. ............................. 455/569.1; 455/569.2; 455/557; 455/550.1

(58) Field of Classification Search ............ 455/550.1, 455/557, 569.1, 569.2
See application file for complete search history.

(56) References Cited

U.S. PATENT DOCUMENTS 5,479,479 A * 12/1995 Braitberg et al. ......... 455/404.1
6,330,247 B1 * 12/2001 Chang et al. ............... 370/442
6,725,061 B1 * 4/2004 Hutchison et al. .......... 455/557

\* cited by examiner

*Primary Examiner*—Lee Nguyen
*Assistant Examiner*—Sanh Phu

(57) ABSTRACT

A method and apparatus for interfacing an electronic device and an accessory is disclosed. In one embodiment the accessory comprises a communication device. To achieve desired operation of the accessory with the communication device the accessory includes memory configured to store control data or other interface data. Storing the control data in the accessory insures that the communication device has access to the control data tailored to the accessory hardware. Storing the control data on the accessory also creates independence between the accessory an the electronic device such that accessory may be introduced to market after the communication device is purchased. In one embodiment the control data is downloaded to the communication device for use by the communication device. The communication device may permanently store the control data such that the download process may be avoided during subsequent use of the accessory with the communication device.

28 Claims, 11 Drawing Sheets

ACCESSORY INTERFACE SYSTEM

FIELD OF THE INVENTION

The present invention relates to communication device accessories and in particular to communication device accessory interface and detection.

BACKGROUND OF THE INVENTION

Portable electronic devices are popular devices used by individuals to track and store data, manage information, and communicate with other electronic devices. Examples of portable electronic devices include personal display adapters, cellular telephones, wireless communication devices, digital and analog data and voice recorders, sensors, pagers, watches, video display devices, audio devices, digital cameras, video recorders, or any other portable electronic device.

As with most electronic devices in use today there exist a wide array of available accessories to enhance the electronic device. By way of example, for a cellular telephone the available accessories may include, but are not limited to, a speaker phone system for an automobile, a hands free ear piece, a car adapter battery charger, a charging cradle, or an interface module for interfacing the telephone with other electronic devices. As is understood, it is necessary for the electronic apparatus of the telephone to interface with the accessory. Such interface is often controlled by software that instructs the telephone how to interface with the accessory.

In systems of the prior art the electronic device stored the software that controls interaction between the electronic device and the accessory. This presents many drawbacks which the methods and apparatus disclosed herein overcome. One such drawback is that the telephone has a limited amount of memory and is hence limited in the amount of data that can be stored. Hence, the cost of each telephone increases as a result of additional memory in each telephone or, if memory is minimized, the amount of information that can be stored in the telephone is limited. Both of these options are considered undesirable.

Another drawback of systems of the prior art arises as a result of the timing of when a user obtains a telephone and when a user obtains an accessory. In systems of the prior art, the telephone stored all the information necessary for interaction with an accessory. As a result, the data that oversaw accessory operation was stored in the phone at the time the phone leaves the manufacturing plant or when the phone is sold. Consequently, if the data for an accessory changed or if a new accessory with new data was released after purchase of the telephone the telephone will not contain the new data. As a result, the accessory may not be operable with the telephone or the telephone may have to use a generic or default data which may provide poor performance. Some accessories require complex filter control data and thus, failure to utilize an up to date data during accessory interaction is a considerable drawback.

Yet another drawback that arises from storing data on the telephone is that the telephone release date may be delayed while the accessory data is created and tested. As can be understood, a delay in the release date may result in substantial lost profits and a reduction in market share.

Yet another drawback of electronic devices of the prior art is difficulty in determining when an accessory is attached and determining how to interact with an accessory. As can be understood, one aspect of accessory interaction comprises determining when to initiate an interaction process and which interaction process to initiate.

As with most electronic device in use today there exist a wide array of available accessories to enhance the electronic device. By way of example, for a cellular telephone the available accessories may include, but are not limited to, a speaker phone system for an automobile, a hands free ear piece, a car adapter battery charger, a charging cradle, or an interface module for interfacing the telephone with other electronic devices. As is understood, for the electronic apparatus to successfully operate with the cellular telephone, some form of interface between the accessory and the telephone is necessary. The interface, which may comprise a hardware system, is often controlled or assisted by software that instructs the telephone how to interface with the accessory. At other times data was passed to the accessory from the telephone during operation.

Systems of the prior art utilized a digital interface between the telephone and the accessory for exchange of voice data or upload of accessory data from the telephone to the accessory The accessory data traveled on the same channel between the accessory and the telephone as was used for exchange of voice information. This presented many problems and drawbacks. One such drawback of using a shared channel is that the channel was often bandwidth limited. Hence, the channel's limited capacity prevented the free exchange of data from the telephone to the accessory to control the interface. Another drawback was that channel conflicts, between the voice information and the interface data, could arise. These conflict prevented desired operation.

Another drawback of prior art systems is their high cost. The prior art method and apparatus used to detect the type of accessory attached to the electronic device required expensive and complex hardware and software detection systems. This cost, when multiplied by a large number of telephones, undesirably reduces profits or increases the cost to the consumer of the electronic device.

Yet another drawback of the prior art accessory detection is that a user's ability to hot-swap an accessory may be limited. In some prior art wireless communication devices a single channel was utilized for both accessory interface and voice communication. Thus, in the case of a wireless communication device the user may not be able to remove the wireless device from an automobile speaker phone system and continue the call with a earphone system after leaving the car. This is an example of a hot-swap operation. An inability to perform a hot-swap operation can be considered a major disadvantage and limit the intended purpose of a portable communication device.

Thus, there exists a need for a method and apparatus to overcome these drawbacks in the prior art. The method and apparatus disclosed herein overcomes these drawbacks.

SUMMARY OF THE INVENTION

The method and apparatus described herein overcomes the problems and drawbacks associated with the prior art by providing an efficient and rapid method to insure the proper control data is available for use by a electronic device, such as a communication device, to properly interface with an accessory. In systems of the prior art the electronic device is sold with pre-stored control data loaded into the memory of the electronic device. Over time however, new accessories are introduced or existing accessories are modified or improved. The new or modified accessories may have new or modified control data that is tailored for use with the new or modified accessory. As a result, the pre-stored control data on the electronic device is no longer the most up to date control data. A default, or best match control data stored on the electronic device often had to suffice. Failure, by prior art systems, to use the most up to date control data resulted in inferior performance or incompatibility.

The present method and apparatus overcomes the drawbacks associated with the prior art by associating or storing the control data with the accessory. Accordingly, the accessory includes memory configured to store the control data and interface with an electronic device. This provides the advantage of the most current control data, which is tailored for the accessory, always being associated with the accessory and available for use by an electronic device that may connect to the accessory. New accessories may be released, after the release or purchase of the electronic device, that contain the most up to date control data. In addition, if the accessory must be modified, the control data may also be updated to account for the modification.

In one embodiment the control data is stored in a non-volatile memory and identified by a version ID. The term nonvolatile memory comprises a memory whose stored data is undisturbed by removal of operating power. The control data may be downloaded or transferred to the electronic device for use by the electronic device to guide operation of and interface with the accessory. In one embodiment the electronic device comprises a wireless telephone and the accessory comprises a hands free system for use in an automobile. In such an embodiment the telephone may include a processor and the accessory may include a memory or a controller, or both. A bus, such as a four conductor bus may interface the accessory to the telephone and be made available for transfer of control data to the telephone if necessary.

In one embodiment the telephone may access the accessory memory to obtain information regarding the control data and the accessory. In one embodiment the control data on the accessory is identified by a version ID. The telephone compares the control data version ID obtained from the accessory to control data version ID's stored in the telephone memory. If a matching version ID is found, then the control data associated with that version ID is selected for use with the accessory.

In one embodiment a method and apparatus is provided for accessory detection and identification. In one configuration the accessory includes one or more outputs, such as conductors or terminals. The electronic device includes corresponding input terminals for connection to the accessories output. The electronic device monitors its input terminals for a change in voltage level, such as for a signal. Upon detection of a signal, a determination can be made that an accessory is attached. In addition, analysis of the output signals or input pattern occurs to identify a type of accessory connected to the electronic device. By detecting a type or category of accessory that is connected to the electronic device, the electronic device may take the appropriate action to interface with the accessory.

If a matching version ID is not found then the telephone processor initiates a download process to obtain the correct control data as stored on the accessory. In one embodiment the downloaded control data is stored in the non-volatile memory of the telephone for use the next time the telephone interfaces with the accessory. In one embodiment the control data is not stored and the download process occurs every time the accessory is connected to the telephone.

In one embodiment the accessory is further configured with a storage register. The register is configured to store one or more bits of data. In one embodiment the bits of data serve as flags to be read by the electronic device to communicate the settings of the accessory. In one embodiment the accessory comprises a hands free system and the registers store data regarding whether the mute is set or whether the radio is on.

DETAILED DESCRIPTION OF THE INVENTION

A method and apparatus for accessory detection and interface is disclosed. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
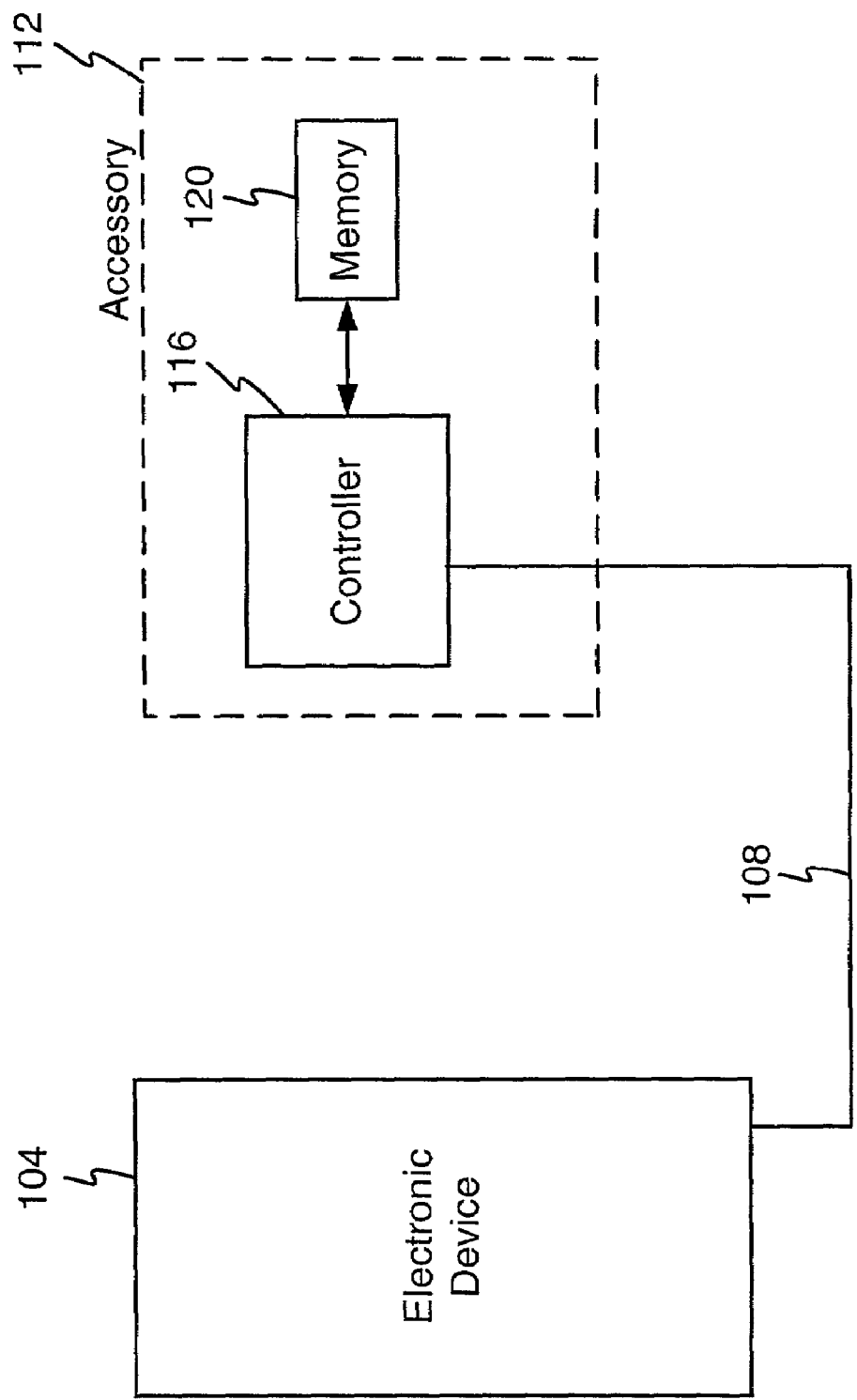
FIG. 1 illustrates a block diagram of an example embodiment of an accessory with memory.

FIG. 1 illustrates an example embodiment of the invention. As shown electronic device 104 connects to an accessory 112 via a cable 108. The electronic device 104 may comprise any type of electronic device as may be contemplated by one of ordinary skill in the art. Examples of electronic devices that may benefit from the principles described herein include, but are not limited to, communication devices, personal digital assistants, cellular telephones, wireless communication devices, digital and analog data and voice recorders, sensors, pagers, watches, video display devices, audio devices, digital cameras, video recorders, or any other portable electronic device. It is contemplated that the electronic device 104 be configured to interface with an accessory 112. The cable 108 facilitates exchange of data and electrical signals between the electronic device and the accessory. Although described as a cable 108, any type channel or information exchange system or medium may be implemented without departing from the scope of the invention. In other embodiments the cable 108 may comprise any number or type of wire(s) or fiber(s) capable of carrying electrical signals or information. In addition, the cable may be replaced with a wireless channel, such as radio or other frequency energy or free space optics. The accessory may comprise any type accessory for use with any of the above-described variety of electronic devices.

In the example embodiment shown in FIG. 1, the accessory 112 includes a controller 116 in communication with memory 120. The controller 116 includes an external connection 110 for connection to systems external to the accessory 112. The controller 116 may comprise any type of controller, control logic, ASIC, processor or any other type device or system configured to facilitate interface between the electronic device 104 and the memory 120. In one embodiment the cable 108 or a portion of the cable connects directly to the memory.

The memory 120 comprises any type data storage system capable of storing data, software code, control instructions or other information. The memory 120 may comprise RAM, ROM, flash memory, disk drive, micro-drive, EPROM, magnetic memory, optical memory, CD or DVD memory. Any amount of memory 120 may be placed in the accessory. In one embodiment the accessory contains one to five kilobits of memory 120. In other embodiments, any amount of data may be stored on the accessory. In one embodiment the memory 120 stores control data configured to interface the electronic device 104 with the accessory. In one embodiment the controller 116 and memory 120 are integrated into a single system. Control data is defined herein to mean any data that aids, guides, assists, or controls interaction or operation between the accessory 112 or electronic device 104. The control data may include data that controls accessory or electronic device operation or interaction or software code or software patches or updates and may optionally be encapsulated within a packet and may include execution or activation instructions. Accessory interaction is defined herein to mean the operations, communication, or interface that occurs between an accessory and an electronic device prior to, during and after their use together. Examples of aspects or information that may be controlled or provided by control data, includes but is not limited to, echo canceler operations such as tuning parameters, the number of multipaths, the echo intensity, filter settings or coefficients, noise reduction system operation parameters and duration of operation, volume settings and number of steps, volume power levels, the tone or frequence response of a device, stereo mute options, volume tables. In one embodiment the control data dictates how a communication device interacts with or handles an accessory. In one embodiment the control data defines the address mapping of an accessory memory or a register.

In operation it is desired to interface the electronic device 104 with the accessory 112. At start-up, the electronic device 104 is energized. Thereafter the accessory 112 attaches to the electronic device 104 and the electronic device attempts to detect the type of accessory or determine how to interface with the accessory. This process is described below in more detail. In one embodiment it is desired to obtain data, such as control data, or have such data available, to control interface between the accessory 112 and electronic device 104. In one embodiment the accessory 112 overcomes the drawbacks of the prior art by storing the control data on the accessory 112. The control data may be associated with accessory 112 in any manner and in one embodiment the control data is stored in the memory 120. Storing the control data in the memory 120 provides the advantage of insuring the proper control data is with the particular accessory 112 and that the electronic device 104 has access to the control data. This also reduces the amount of memory required in the electronic device thereby reducing the cost of each electronic device 104. Through interface between the electronic device 104 and the accessory 112 over the cable 108 the electronic device gains access to the control data.

This configuration is shown for purposes of discussion only and the claims that follow should not be considered to be limited to this embodiment. It is contemplated than numerous other configuration may be arrived at by one of ordinary skill in the art that are able to achieve the benefits described herein by storing or associating interface data or control data in the accessory.

Figure 2:
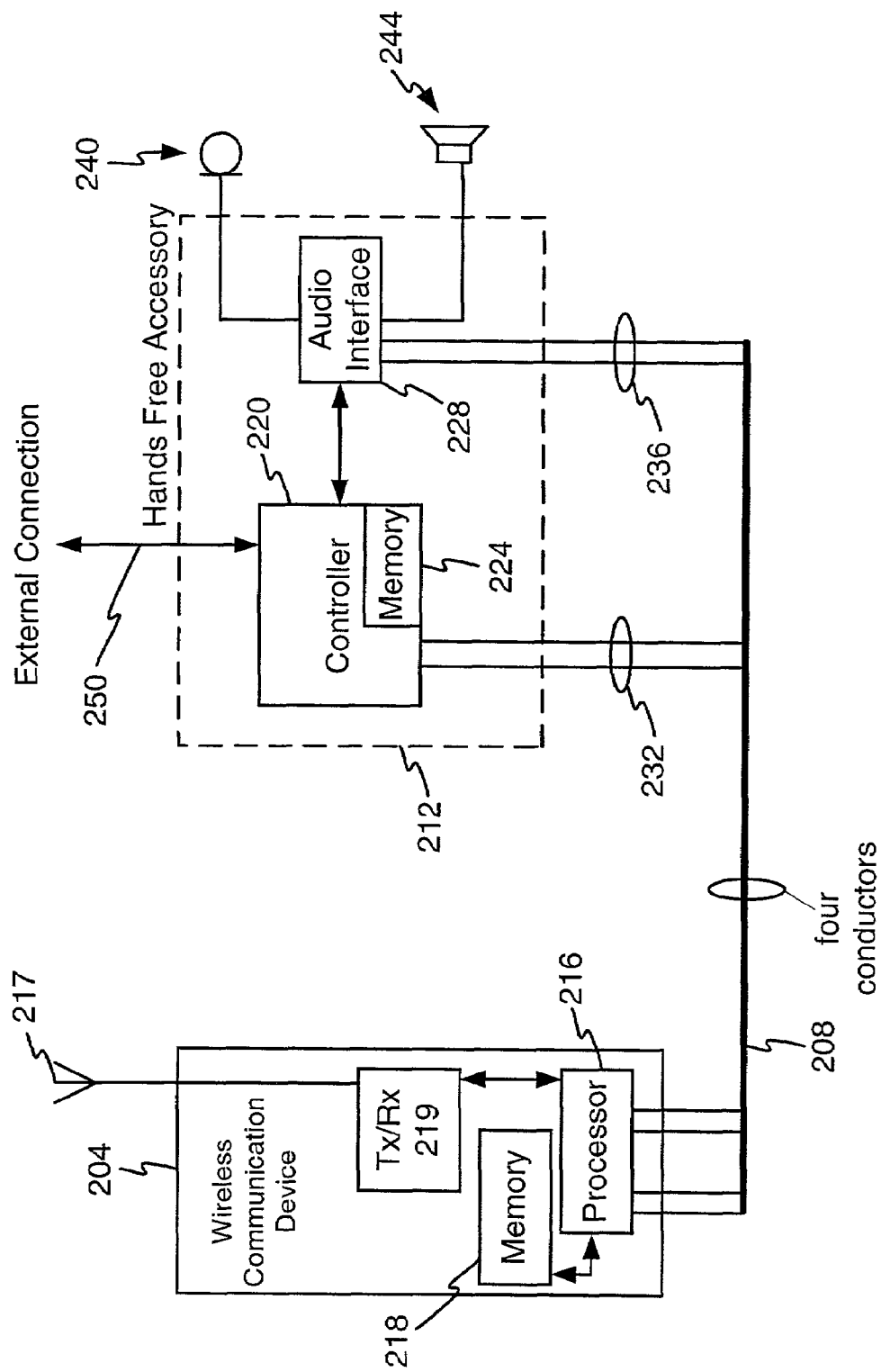
FIG. 2 illustrates a block diagram of communication device embodied with an example configuration of a memory equipped accessory.

FIG. 2 illustrates a block diagram of an example embodiment of a memory equipped wireless communication device accessory. A communication device 204 connects to an accessory 212 via a conductor 208. In this example embodiment the accessory 212 comprise a speaker phone system, such as a hands free system and the conductor 208 comprises a four conductor bus. In other embodiments the conductor 208 may comprise any number of lines and the accessory 212 may comprise any type of accessory. Example accessories include but are not limited to, a speaker phone system for an automobile, a hands free ear piece, a car adapter battery charger, a charging cradle, or an interface module for interfacing the telephone with other electronic devices.

The communication device 204 includes a processor 216 that connects to the conductor 208. The processor 216 is in communication with memory 218 and configured to interface the communication device 204 with the accessory 212. The processor 216 may comprise any type processor, controller, ASIC, or control logic as could be used to interface the accessory 212 with the communication device 204 or oversee operation of the communication device. The communication device memory 218 may comprise any type of data storage device. In one embodiment the processor 216 and the memory 218 operate in unison such that the memory stores data, software code, or both configured for use or execution by the processor as may be required. A tranceiver (Tx/Rx) 219 connects to an antenna 217 and the processor 216.

In the embodiment shown in FIG. 2, the accessory 212 is configured as a hands free accessory such as may be installed in an automobile for use with a cellular telephone or other communication device. The accessory 212 includes a controller 220, memory 224, and an audio interface 228. The memory 224 interfaces with the controller 220 or, in one embodiment interfaces with the two lines 232. It is contemplated that some form of controller 220 may be included to oversee access to the memory 224. In another embodiment the memory 224 includes an internal controller and hence the controller 220 would be eliminated or incorporated into the memory 224. Such a configuration is contemplated for any embodiment or figure where a memory or controller is discussed or shown.

In the example embodiment shown the two lines 232 of the conductor 208 connect to controller 220 and two lines 236 of the conductor connect to an audio interface 228. The audio interface 228 may comprise any type of device capable of assisting operation of audio systems such as those shown and described herein. In one embodiment the audio interface 228 comprises a CODEC. In one embodiment the audio interface 228 comprises an audio amplifier. Hence, the audio information may be provided to the communication device in analog or digital format. The controller 220 and audio interface 228 may communicate or exchange data over any type of connection as shown.

In one embodiment the conductors 232 comprises an $I^2C$ bus. The $I^2C$ bus provides a low overhead data interface system for use with a limited number of conductors, in this example embodiment two. Any type conductor 232, bus, or memory system may be used including, but not limited to, Dallas type bus system, such as the Dallas 1 wire conductor, SPI bus, multibus, 2WB, any type of serial bus, parallel bus, a PCM bus or any other type of bus or data transfer system or protocol. The controller 220 further includes an external connection 250 configured to interface or connect the accessory 212 to a separate system or power supply. The external connection 250 of the accessory 212 facilitates interaction and interface with other systems or devices. Although an external connection 250 is shown, including of an external connector is optional and is dependant of the needs of the accessory and electronic device. In one exemplary embodiment the accessory 212 is a hands-free system or speaker phone system for use in an automobile and the electronic device 204 comprises a wireless communication device. The terms hands-free system or speaker phone are defined herein to mean devices that allow a user to communicate over a communication device, such as a telephone, without the user physically holding a the communication device to their ear. In such an exemplary embodiment the optional external connection 250 may comprise a connection to the automobile's power supply, a connection to the automobile's ignition system, or a connection the automobile's radio for volume control. When the accessory 212 and electronic device 204 assume other forms the use and configuration of the external connection 250 may vary.

In operation, the processor 216 and memory 218 of the communication device 204 interface via the conductor 208 with the accessory 212 to provide speaker phone operation. It is contemplated that the processor 216 utilize control data regarding the type of accessory 212 to which it is attached and regarding how to interface with the accessory. In one embodiment one or more of the audio interface 228, controller 220, and processor 216 may perform echo cancellation or other complex processing on a signal to achieve desired operation. The control data that controls such operation are desirably stored in the memory 224 of the accessory 212. The control data stored in the accessory 212 may be accessed via the conductor 232 by the communication device 204 to control operation between the two systems. As discussed above, storing the control data on the accessory 212 provides the advantages of reducing the storage requirement on the communication device 204, insuring updated and tailored control data for use with the accessory, providing flexibility for future use of different components in the accessory which may necessitate the use of modified control data.

The audio interface 228 also connects to a microphone 240 and a speaker 244. Any type microphone 240 and speaker 244 may be utilized. It is understood that microphones and speakers posses individual and unique performance characteristics. It is desired to accommodate these unique performance characteristics to achieve desired operation. By storing the data, i.e. control data, that defines the microphone and speaker behavior in the accessory 212 the proper control data is present for use by the communication device 204.

Figure 3:
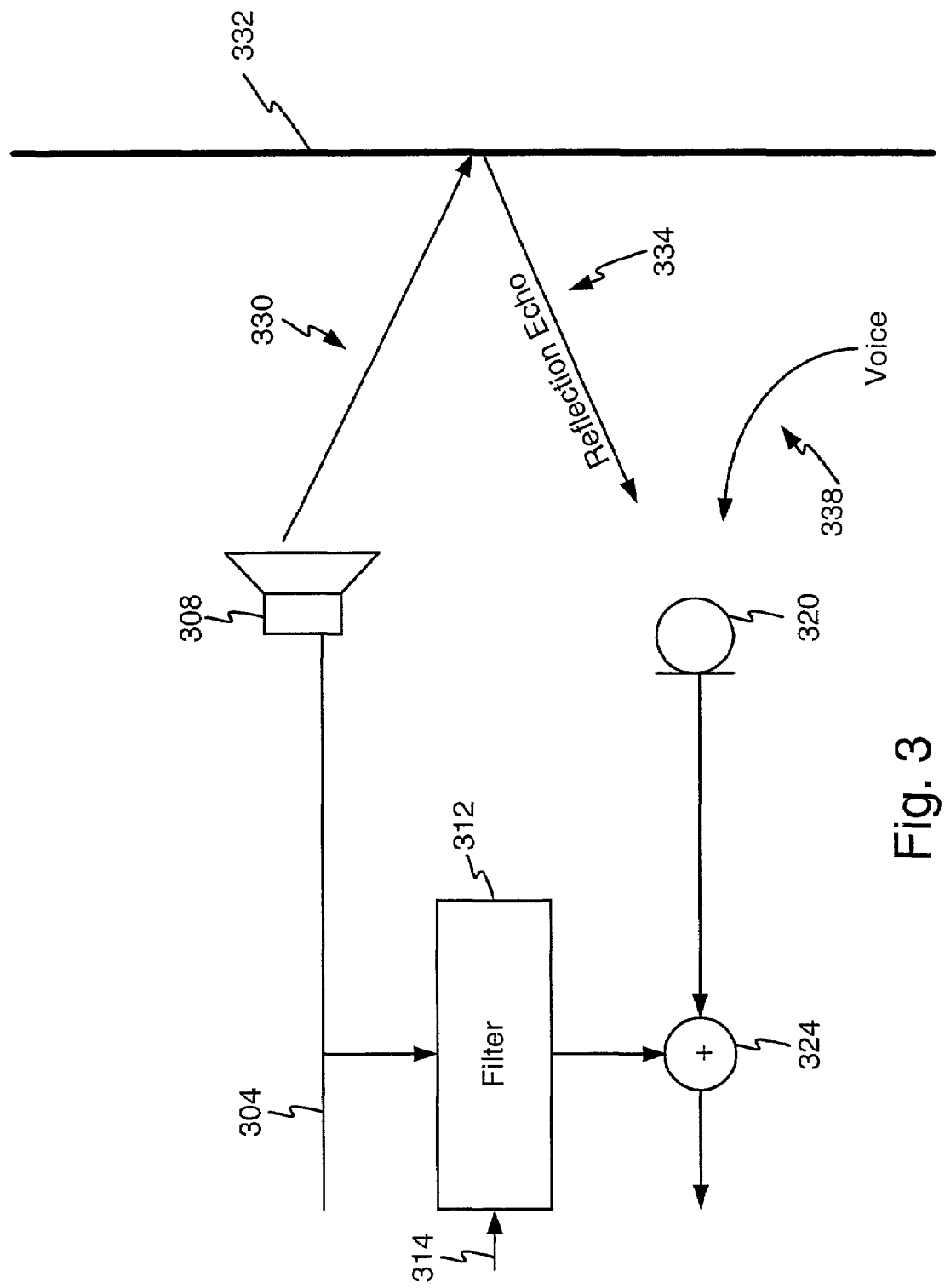
FIG. 3 illustrates feedback principles of speaker telephone.

FIG. 3 illustrates a block diagram of a feed forward echo cancellation system. FIG. 3 and the discussion that follows illustrates the benefit of matched control data in the accessory. As shown an audio output line 304 connects to a speaker 308 and a filter 312. The filter 312 also receives filter coefficients over input 314, which may be determined in part by the control data. By providing optimized control data, such as those stored on the accessory, the filter is optimized for the particular speaker 308 and microphone pair 320. This provides a more clear output than generic equalizer coefficients. The filter 312 provides an output to a summing junction 324. The filter 312 provides its output to the summing junction 324. It may be provided as a positive or negative input. The summing junction 324 also receives an input signal from the microphone 320. The output of the summing junction 324 is provided to a communication device (not shown) for processing.

In operation the output signal is sent to the speaker 308 and filter 312 on line 304. The speaker generates an audible signal shown by line 330. Simultaneously, the microphone 320 of the hands free unit receives a voice signal 338 for processing by the hands free system. Undesirably however, the microphone 320 also receives an echo wave 334 reflected back from surface 332. The echo wave 334 interferes with desired speaker phone operation by providing an echo signal for amplification as a received signal.

In the embodiment of FIG. 3, the filter 312 receives the signal on line 304 and feeds forward a signal to be subtracted from the microphone 320 output to thereby eliminate or reduce the reflection echo 334. To achieve proper operation however, the filter utilizes specific filter coefficients, which are determined by the speaker, microphone, and accessory configuration. As a result of storing or associating the control data with the accessory, the communication device and accessory are best able to operate in an intended manner and reduce the echo.

This is but one specific example of how an accessory and communication device will benefit from storing the control data in the accessory. Other inherent benefits are contemplated as other aspects of operation will also be improved.

Figure 4:
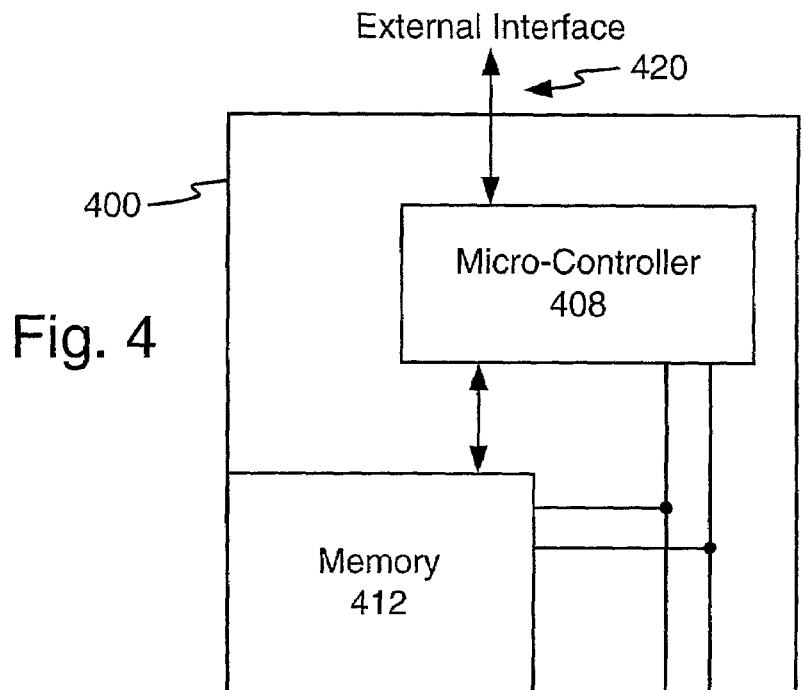
FIG. 4 illustrates a block diagram of a first embodiment of an accessory.

FIG. 4 illustrates a block diagram of an example embodiment of an accessory 400 with the memory 412 separate from the controller 408. As shown, data bus lines 404 connect to a micro-controller 408 and a memory 412 for the exchange of data between the micro-controller 408, the memory 412, and an electronic device (not shown). In this embodiment the memory 412 is separate from the micro-controller 408. The memory 412 and micro-controller 408 communicate and an external interface 420 connects to the micro-controller. In this embodiment the memory 412 stores information, settings, data, or software code, collectively control data, that achieve desired operation of the accessory 400 with the electronic device.

Figure 5:
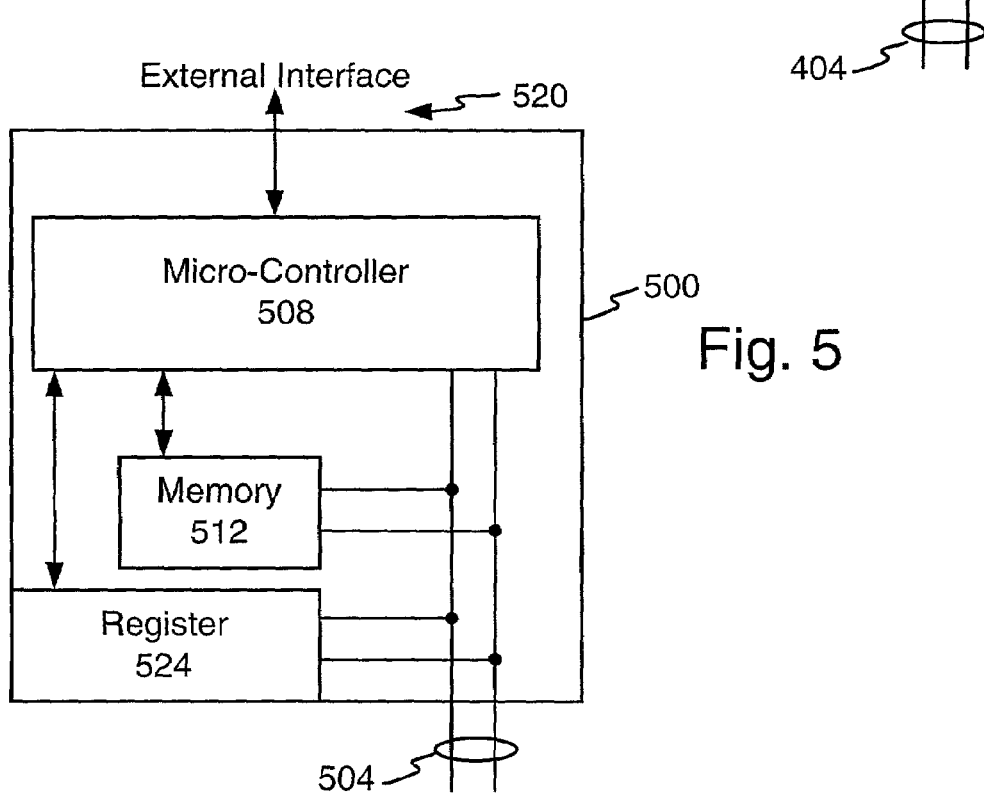
FIG. 5 illustrates a block diagram of a second embodiment of an accessory.

FIG. 5 illustrates a block diagram of an example embodiment of an accessory 500 with a storage register 524. As shown, data bus lines 504 connect to a micro-controller 508 and a memory 512 for the exchange of data between the micro-controller 508, the memory 512, and an electronic device (not shown). In this embodiment the memory 512 is separate from the micro-controller 508. The memory 512 and micro-controller 508 communicate over a channel and an external interface 520 connects to the microcontroller. In this embodiment the memory 512 stores information, data, settings, or software code, collectively control data, that achieve desired operation of the accessory 500 with the electronic device.

The register 524 is in communication with the microcontroller 508 and bus 504. The register 524 may comprise any type storage unit configured to store one or more bits of data. In one embodiment the storage register 524 stores data that defines or controls certain aspects of operation for the micro-controller 508. It is desired to make the accessory 500 self-defining and operable with numerous electronic devices without need of data stored on the electronic device. In one embodiment the register 524 stores data regarding the particular configuration or connection of the accessory at the time of use. In one embodiment the register 524 stores data regarding the address of relevant data in the memory 512. In one embodiment the register 524 stores data regarding stereo mute status. In one embodiment stereo mute status data comprises data regarding whether the stereo is muted, i.e. the stereo volume is set to zero, such as may be desired when speaking on at hands-free telephone in an automobile. In other embodiments, the register 524 may store any other type data.

It is further contemplated that the register 524 may comprise control logic. In such an embodiment the control logic would store or indicate the status of an aspect of operation as discussed above regarding the register 524. Moreover, the register 524 or control logic could control the accessory without use of any other device or system.

Figure 6A:
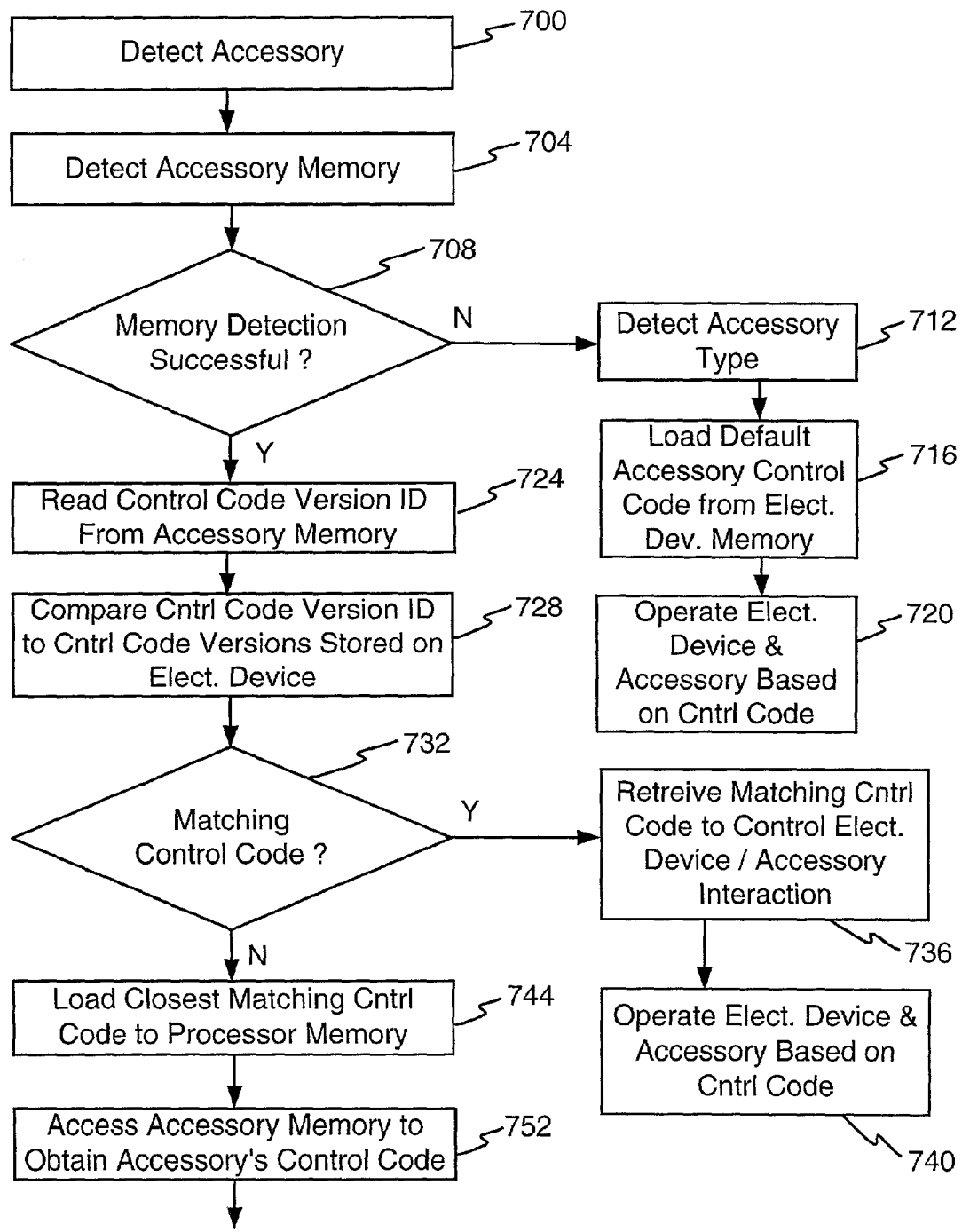
FIGS. 6A and 6B illustrate a n operation flow diagram of an example method of operation.

FIG. 6A illustrates an operational flow diagram of an example method of operation of one embodiment of the invention. Use of this method or a related method allows a communication device and accessory to enjoy the advantages and benefits of control data storage on the accessory. This method could apply to any electronic device and accessory. As this is but one example method of operation it is contemplated that other methods exist which to do not depart from the scope of the claims. At a step 700 the operation detects the accessory. Any method of accessory detection may be used. One example method off detection is discussed below in greater detail. At a step 704 the operation attempts to access the memory on the accessory. This may be considered a memory read or memory detection operation. It is contemplated that not all accessories will include memory, such as for example older accessories that are not configured to store control data.

Since not all accessories include memory with control data stored thereon, at a decision step 708 the operation determines if the memory detection was successful. If the memory detection was not successful, the operation advances to a step 712. The memory detection may be unsuccessful for a reason other than a non-memory equipped accessory. At step 712 the operation detects the accessory type. Any type of detection may occur and is performed to aid the communication device as to how to interact with the accessory. Thereafter, the operation advances to a step 716 and the electronic device retrieves for use from its memory default control data for use by the processor of the electronic device. While the default data may not be the preferred control data, it may enable operation of the accessory, albeit at a potentially lower level of quality. After loading the default control data for use by the electronic device, the operation advances to a step 720 and the electronic device and accessory operate in the best manner possible considering non-preferred control data may be in use.

Alternatively, if the memory detect of decision step 708 was successful, the process advances to a step 724. Since the memory detect was successful, the accessory has memory and accordingly, at step 724 the electronic device reads a control data version ID from the accessory memory. It is contemplated that the control data version ID be stored in the memory of the accessory and identify the version or format of the control data that is stored on the accessory. In one embodiment, each different control data, or version thereof, receives a different version ID. In one embodiment the version ID also identifies the exact type of accessory.

Figure 7:
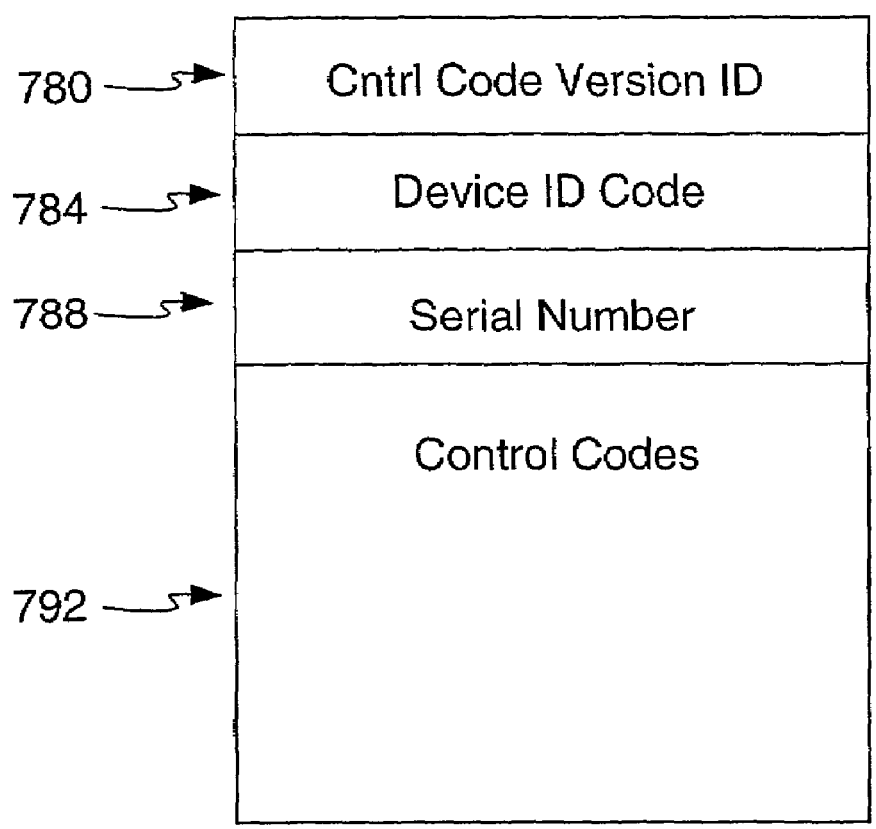
FIG. 7 illustrates exemplary contents of accessory memory.

Jumping briefly to FIG. 7, an example accessory memory unit is illustrated. In the example embodiment of FIG. 7 a first memory location 780 contains a control data version ID. In one embodiment the control data version ID identifies the control data. A second memory location 784 may contain a device ID code. The device ID code may identify which type of device the accessory comprises. A third memory location 788 may contain device serial number that identifies the accessory. The device ID and device serial number may be included to aid identification of the device or tracking of the device. Any other or additional information may be stored at other memory locations to aid in data transfer, or accessory or control data identification. It is contemplated that a communication device may be programmed to automatically read or detect memory location 780. A memory location 792 stores the control data. In another embodiment the memory location 792 stores an address or pointer to the control data.

Figure 6B:
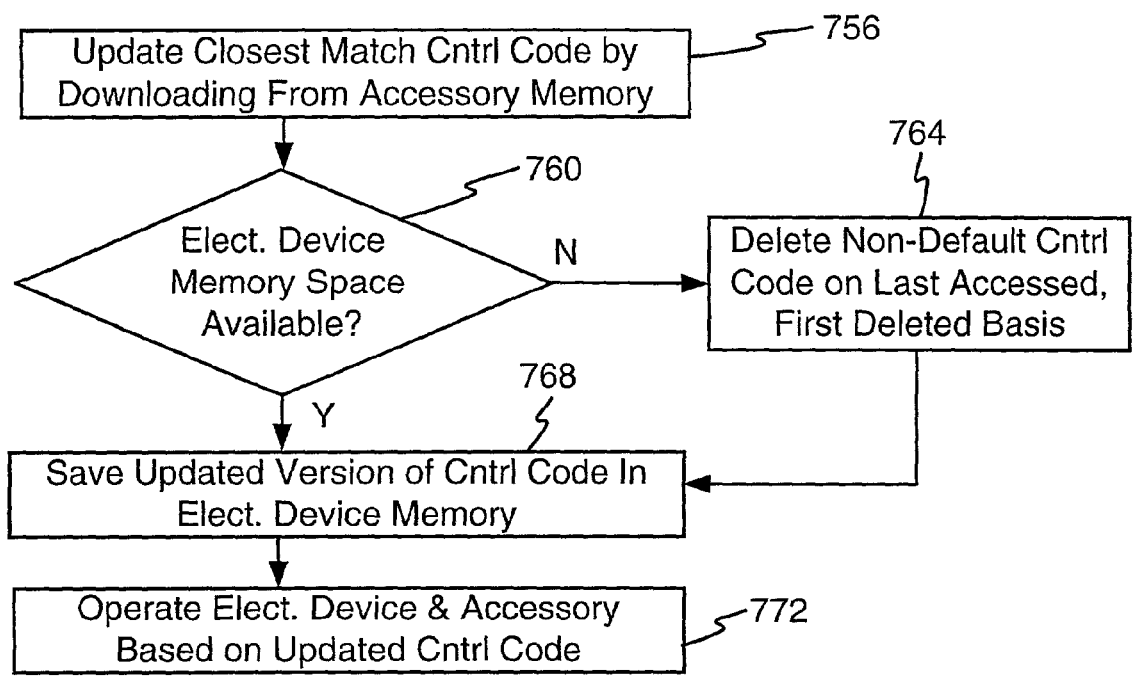

Returning to the operation of FIG. 6, after reading the control data version ID from the accessory memory the process advances to a step 728. At step 728 a comparison occurs between the control data version ID read from the accessory memory and control data version IDs that are stored on the electronic device. Each control data version may be provided a unique control data ID used to identify the control data. This ID can be used to quickly and efficiently compare versions, i.e. the contents, of a control data. In one embodiment the electronic device performs the comparison while in another embodiment the accessory includes apparatus to perform the comparison.

At a decision step 732 a determination is made regarding whether the electronic device contains in its memory a matching control data version ID, and hence a matching control data to that stored on the accessory. If the electronic device does contain a matching control data then the operation advances to a step 736. At step 736 the control data that is stored on the electronic device and that has a matching control data version ID is recalled from the electronic device memory for use by the electronic device. In one embodiment the matching control data is loaded to a processor memory for use by a processor. Thereafter, at step 740 the electronic device and the accessory operate and interface based on the matching control data.

Alternatively, if at step 732, a matching control data version ID is not stored on the electronic device then the operation advances to a step 744. At step 744 the electronic device loads the control data from the electronic device that is most similar to the control data stored on the accessory and identified by the version ID. In one embodiment the control data is loaded from the non-volatile memory of the electronic device to the memory associated with a processor. The electronic device may initiate operation at this point using the control data.

Thereafter, at step 752 the operation accesses the accessory memory to read the control data stored on the accessory memory. This involves use of a electronic device/accessory interface to facilitate exchange of data, such as control data, between the electronic device and the accessory. In one embodiment the interface comprise a controller, a processor, or control logic. At a step 756 of FIG. 6B, using a comparison or other analysis, the closest match control data in the electronic device processor memory is updated by the control data downloaded from memory. In this manner the processor memory is updated to contain the control data that is stored on the accessory. In one embodiment the comparison and update process results in only the portions of the control data in the accessory that are different than the closest match control data being transferred to the electronic device. The electronic device may initiate operation at this point using the updated control data.

Now that the processor memory contains the updated control data that is specifically tailored for the accessory, it may be desired to save the control data to a non-volatile memory of the communication device. Accordingly, at a decision step 760 it is determined if the electronic device has sufficient memory space available to store the updated control data under the corresponding control data version ID. It is contemplated that the updated control data will be stored in non-volatile memory so that if the accessory is used with the electronic device in the future the electronic device will contain a match to the control data version ID that is associated with the accessory. Thus, the above-described update process would not have to occur every time the accessory is connected. If at step 760 it is determined that memory space is not available then the operation advances to a step 764 and the communication device deletes non-default control data stored in its memory. In one embodiment the deletion occurs on a least recently accessed—first deleted basis such that the control data that was accessed least recently is the first to be deleted.

After step 760 or 764 the operation advances to a step 768 wherein the operation saves the updated version of the control data in the electronic device memory. This insures that the control data that is specifically tailored to the accessory is available for use in the future if the accessory is attached or used with the electronic device. After saving the updated version of the control data the operation advances to step 772 and the electronic device and accessory operate and interact based on the updated control data. This provides the advantage of having the control data specifically designed for the accessory available for use with the electronic device.

Figure 8:
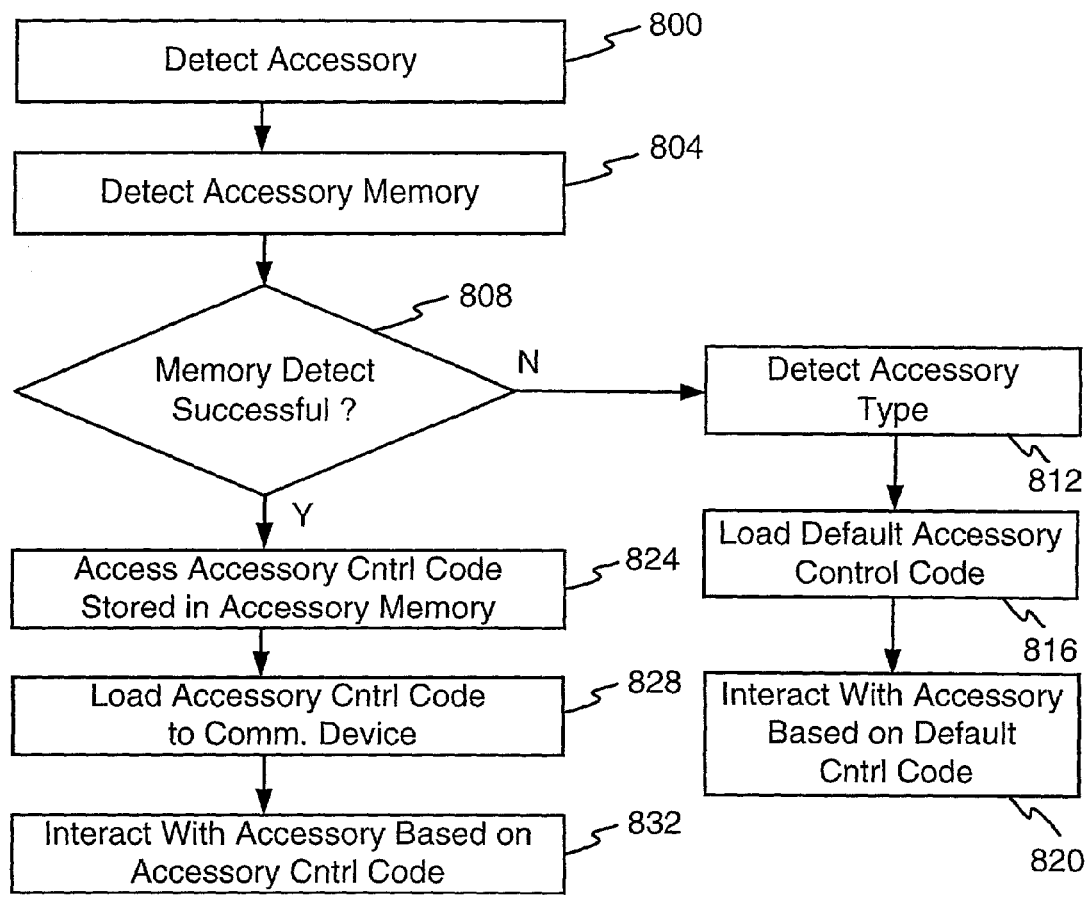
FIG. 8 illustrates an operation flow diagram of an alternative method of operation.

FIG. 8 illustrates an operational flow diagram of an alternative method of operation. The method of operation shown in FIG. 8 is a method of operation in which the control data of the accessory is loaded to the electronic device from the accessory at start-up each time the accessory is used with the electronic device. The method may be initiated by detecting the accessory at a step 800 and, at a step 804, attempting to detect the accessory memory. By determining if the accessory is equipped with memory the electronic device determines if control data is available on the accessory. Accordingly, at a decision step 808 the operation determines if the memory detection was successful. If memory was not detected then the operation advances to step 812 and the operation detects the type of accessory attached to the electronic device. It is helpful to detect the accessory type since the accessory does not include memory with control data stored thereon. Therefore, a best-match control data must be selected from those stored on the electronic device. After the type of accessory is detected, the electronic device loads default or best-match control data for the detected accessory from the non-volatile memory of the electronic device. This occurs at a step 816. Thereafter, at step 820, the electronic device and the accessory interact based on the default control data.

Alternatively, if at step 808 memory is detected then the operation advances to a step 824. Since the memory with control data stored therein is in the accessory, step 824 comprises accessing the control data from accessory memory. As a result the operation loads the accessory control data to the electronic device. In one embodiment the control data is loaded to a memory associated with a processor in the electronic device. After the control data is loaded in the electronic device the electronic device and the accessory may interact and operate in a manner based on the transferred control data.

It will be understood that the above described arrangements of apparatus and the method therefrom are merely illustrative of applications of the principles of this invention and many other embodiments and modifications may be made without departing from the spirit and scope of the invention as defined in the claims.

In one embodiment the method and apparatus described herein is adapted to facilitate use of an accessory as a demo-device. In such an embodiment the control data may be configured to allow use of the accessory for a limited period of time or for a limited number of uses. After the number of uses or the period of time has been exceeded, the accessory may cease to operate or provide an audio or visual message regarding the reason for non-use and where to purchase a non-demo version of the accessory. In such an embodiment the accessory may be given away or at a discount to lure potential purchasers to buy the accessory after the demo period is expired.

In another embodiment the method and apparatus described herein is adapted to incorporate a security layer into the accessory or interaction with the electronic device. In such an embodiment the control data may include a security code or other security information or means to control or limit use of the accessory. This may reduce theft or instances of stolen communication services. In addition, the control data may comprise security codes or accesses codes that are stored in the accessory memory to inhibit use of counterfeit or un-licensed accessories with the electronic device.

In another embodiment the method and apparatus described herein is adapted to assist in debugging of an accessory or determining a source of error with an accessory or communication device. The memory on the accessory may be made to store data regarding accessory operation or communication device operation. By storing this data on the accessory that is equipped with memory the accessory may be configured as a debugging tool to which data is stored. The debugging accessory may be provided to technical personnel for use in determining problems with electronic device, beta testing, or monitoring use of a telephone. With regard to monitoring, data may be written to the accessory memory to monitor call usage or duration, such as in a rental or loaner telephone. Moreover, the accessory may be equipped to store and track billing data for a limited use telephone or other type electronic device. It is contemplated that an accessory may store a prepaid dollar amount and track usage while subtracting from the dollar amount in relation to use of the telephone.

In one embodiment the accessory equipped with memory may be made to enhance the feature set of the telephone. In one embodiment the memory equipped accessory included software code and processing capability to perform encryption and decryption on incoming and outgoing data or calls.

As an advantage over systems of the prior art, one embodiment incorporates accessory detection capability to thereby speed operation and initialization of an accessory when connected to an electronic device. Further, the accessory detection method and apparatus described herein provides important information to the electronic device regarding the type of accessory that is connected to the electronic device. As can be appreciated, the electronic device's manner of operation and interaction with the accessory is determined, at least in part, by the type of accessory to which it is connected. Therefore, ascertaining the type of accessory connected to the electronic device in a rapid, efficient, and accurate manner provides an advantage to accessory interface.

Figure 9:
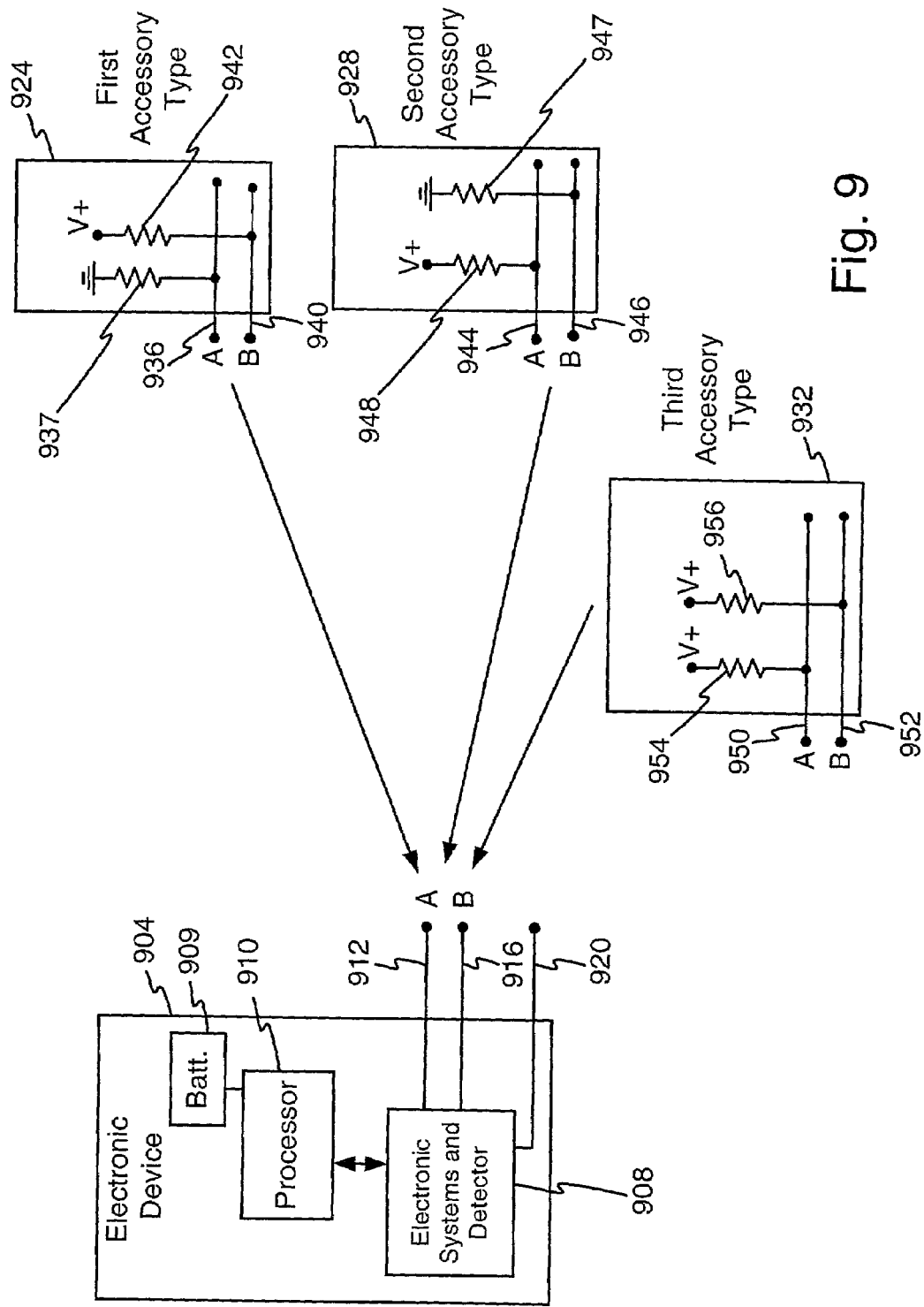
FIG. 9 illustrates a block diagram of an exemplary manner of interaction between an electronic device and various accessory types.

FIG. 9 illustrates a block diagram of an exemplary manner of interaction between an electronic device and various accessory types. The electronic device 904 comprises electronic systems and detector 908 connected to a first input 912 and a second input 916. Although shown with two inputs 912, 916, it is contemplated that more than two inputs may be provided. While the first and second inputs 912, 916 are contemplated for use as data transfer bus lines it is also contemplated that additional conductors 920 may be provided to exchange information such as voice information.

Although described herein as the first and second inputs 912, 916, it is contemplated that the first and second inputs will also serve as outputs to the accessory during the interface stage of operation. The terms first input 912 and second input 916 were selected to aid in understanding as in one embodiment during the detection phase the inputs 912, 916 receive signals, such as a DC voltage level. In another embodiment the accessory may not be powered and hence unable to provide a signal to the electronic device. As a result, it is contemplated that the electronic device inputs 912, 916 may serve as outputs and output a signal or voltage level to an accessory. The accessory will be configured to respond or accept the signal in a manner that is unique to the particular type of accessory. The electronic device 904 is able to detect how the accessory responds or accepts the signal. In this manner the type or class of accessory may be detected. Those of ordinary skill in the art are aware of accessory configurations that cause the accessory to respond or accept the signal in a way that will identify the type of class of accessory.

Also shown in FIG. 9 is a first accessory 924, a second accessory 928, and a third accessory 932, which are configured to connect to the first input 912 and the second input 916 of the electronic device 904. In particular, the first accessory type 924 includes a first output 936 and a second output 940.

The first output 936 connects to ground through a resistor 937 while the second output 940 connects to a voltage source V+. In one embodiment a resistor 942 is serially connected between the second output 940 and the voltage source V+.

In the second accessory 928 a first output 944 connects to a voltage source V+ and a second output 946 connects to ground through a resistor 947. A resistor 948 may be serially connected between the first output 944 and a voltage source V+. The third accessory type 932 includes a first output 950 and a second output 952. The first and second output 950, 952 connect to a voltage source V+. In one embodiment resistors 954, 956 connect serially between the outputs 950 and 952 and the voltage source V+.

It is contemplated that the outputs of the first accessory type 924, the second accessory type 928, or the third accessory type 932 may connect to the inputs 912, 916 of the electronic device 904. Each of the accessory types 924, 928, 932 represent a type or class of accessories. Hence an accessory type may share some commonality in the way the electronic device 904 interacts or operates when connected to an accessory type. By way of example and not limitation, in one embodiment the electronic device 904 comprises a wireless communication device and the first accessory type 924 may comprise devices that perform charging, the second accessory type 928 may comprise devices that provide audio to the communication device yet lack memory, and the third accessory type 932 may comprise smart accessories, which are defined herein to mean accessories with memory that store control data. These examples or categories of accessory types are provided for purposes of example only and hence the accessory types are not limited to these particular categories.

As discussed above with regard to the inputs 912, 916 of the electronic device 904. The outputs 936, 940, 944, 946, 950, 952 of the accessories types 924, 928, 932 may also serve as inputs to receive commands or signals from the electronic device 904 during interface phase of operation. The outputs 936, 940, 944, 946, 950, 952 provide a signal to the electronic device during the detection phase and hence for purposes of understanding are referred to as outputs during the accessory detection phase. In another embodiment in which the electronic device 904 provides a signal to the accessory to determine the type of accessory, the outputs 936, 940, 944, 946, 950, 952 may be configured to receive a signal from the electronic device. Hence, in certain embodiments or during certain phases of operation the outputs 936, 940, 944, 946, 950, 952 may also serve as inputs. Hence the connection between an accessory and an electronic device is bi-directional.

Prior to connection of an accessory to the electronic device, the detector 908 monitors the inputs 912 and 916. In one embodiment the detector 908 monitors for a voltage level from the accessory thereby not undesirably drawing power such as from a battery 909 from the electronic device 904. Upon connection of the accessory to the electronic device 904 the detector 908 senses the connection by receiving a high voltage on one or more of its inputs 912, 916. The high voltage level is provided by one of the accessories 924, 928, or 932 that is connected to the electronic device. The detector 908 may provide data to the processor 910 regarding which lines are high and the processor may compare the line voltage pattern to a known pattern or simply analyze the line voltage pattern. Based on the comparison or analysis a determination can be made as to the type of accessory 924, 928, 932 connected to the electronic device 904.

Based on the type of accessory connected, the electronic device 904 may initiate one or more different interface routines or operations. By way of example and not limitation if the accessory type is determined to be a battery charging type accessory then the electronic device 904 may prepare for charging and begin displaying charging information on its screen. Conversely, if the accessory is a smart accessory such that it includes control data stored on an accessory memory then the electronic device 904 may initiate a memory read from the accessory and begin the control data comparison or download process other accessory types may initiate different operations within the electronic device.

Several advantages are gained with the accessory detection system as described herein one advantage is that it provides a low cost system for detecting when an accessory is connected. Another advantage is that it provides a method and apparatus to detect a type or class of accessory connected to the electronic device. Another advantage comprises that it draws little to no power during operation. Further advantage is that it is expandable to more than two conductors. A single conductor or more than two conductors may be enabled.

Figure 10:
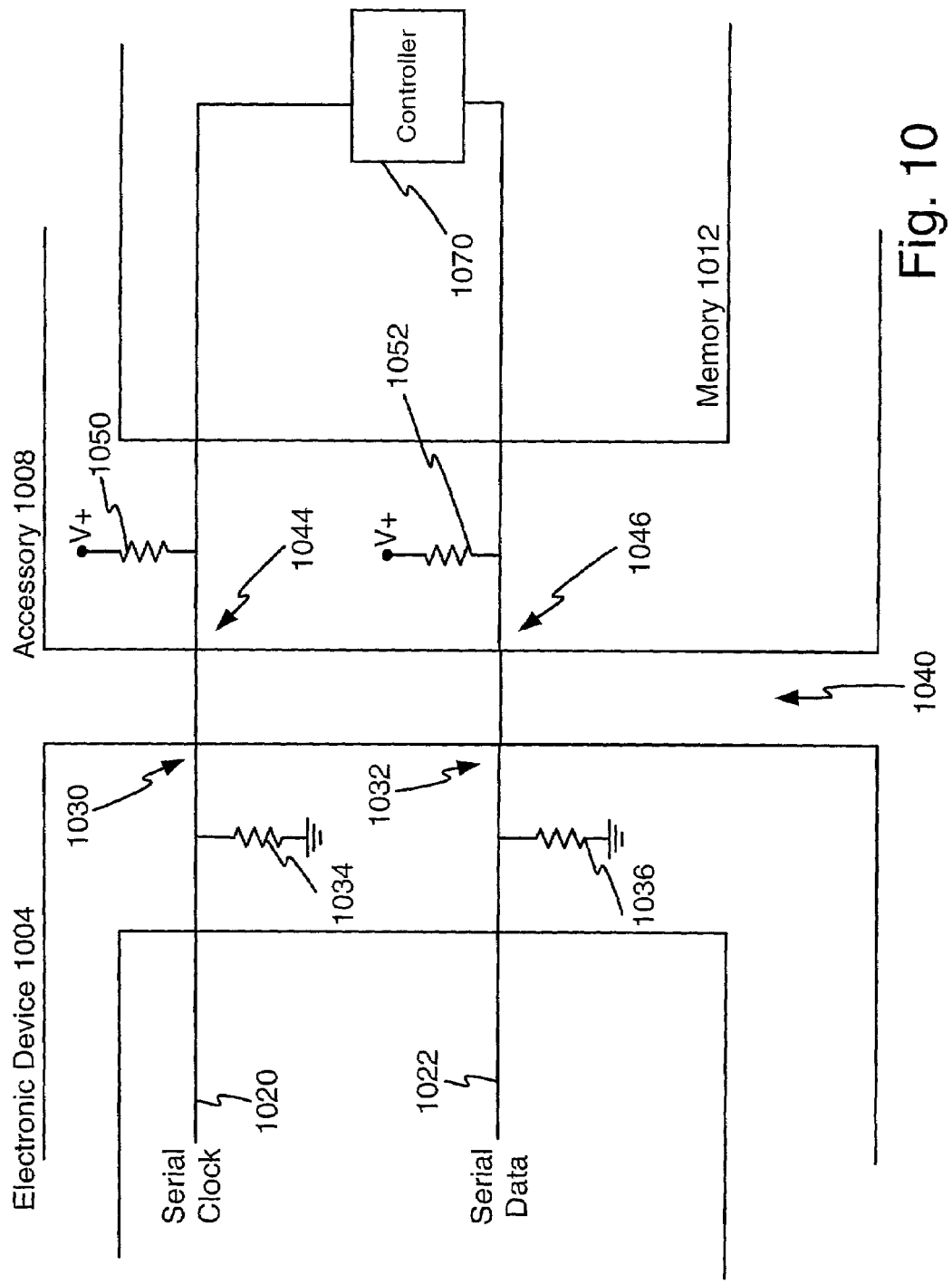
FIG. 10 illustrates an example implementation of an example embodiment of the accessory detection system.

FIG. 10 illustrates an example implementation of an example embodiment of the accessory detection system. This is but one possible implementation. One of ordinary skill in the art may contemplate other configurations that do not depart from the scope of the claims. An electronic device 1004 is represented on the left hand side of the page while an accessory 1008 is represented on the right hand side of the page. Although not required, in the embodiment of FIG. 10, the accessory 1008 includes memory 1012.

The electronic device 1004 include a serial clock input 1020 and a serial data input 1022. Resistors 1034, 1036 connect as shown to the inputs 1030, 1032.

The span or gap 1040 may comprise a cable or conductor. The span 1040 may be of any length or simply comprises a contact on a device, such as a contact on a charger. Accessory outputs 1044, 1046 connect to the electronic device 1004. The outputs 1044, 1046 connect to resistors 1050, 1052, both of which connect to a voltage source V+. The voltage source may comprise any type voltage source including a battery or a hardwired source or combination thereof. The outputs 1044, 1046 further connect to a controller 1070, a processor, control logic, or hardwired to a voltage source or ground. In the embodiment shown in FIG. 10, the controller 1070 is located in accessory memory 1012. In operation the outputs 1044 and 1046 may be controlled to selectively manipulate the voltage levels thereon to be high or low values.

Figure 11:
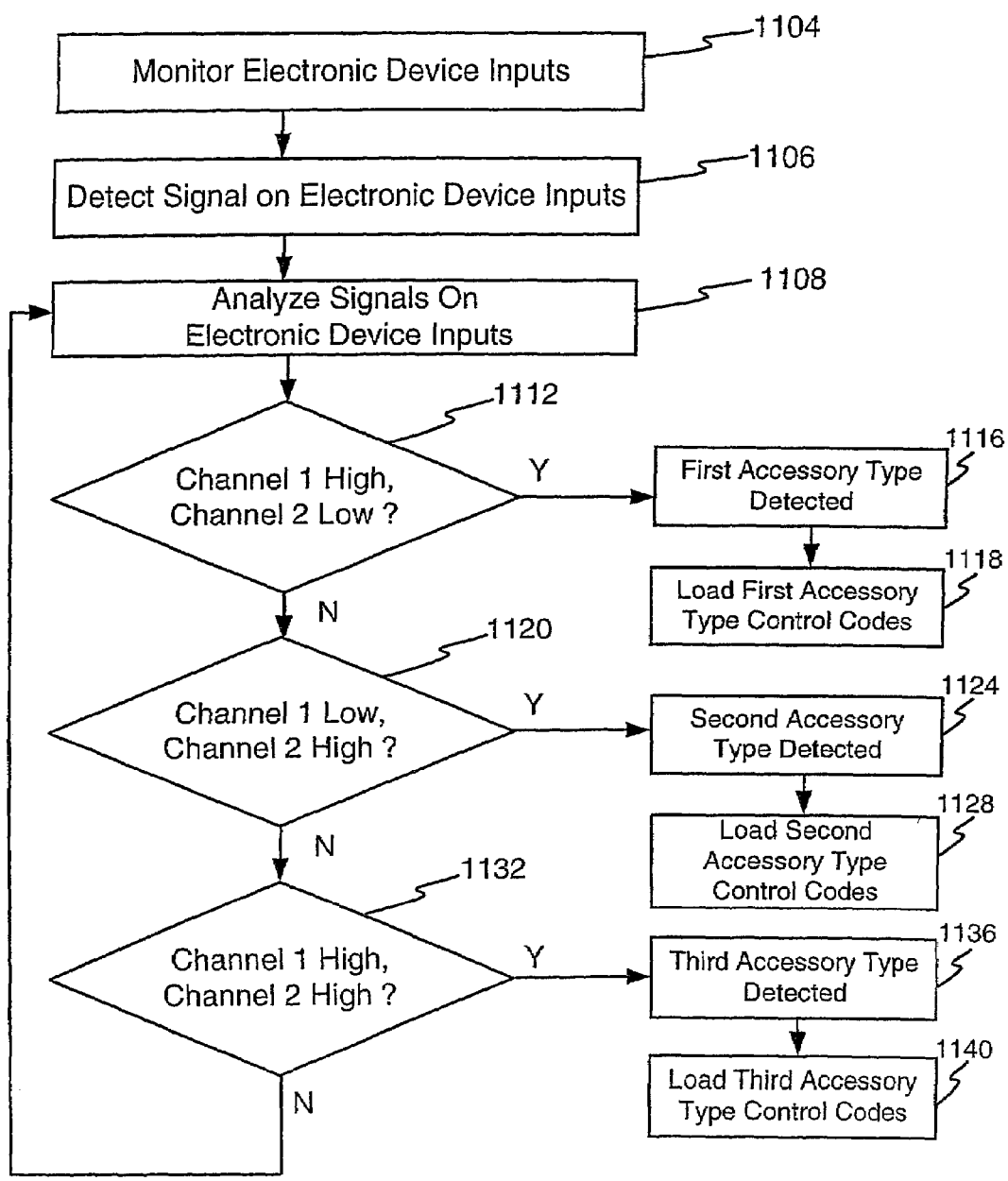
FIG. 11 illustrates an operational flow diagram of an example method of operation of an accessory detection system.

FIG. 11 illustrates an operational flow diagram of an example method of operation of an accessory detection system. Although FIG. 11 illustrates an exemplary method of detecting an accessory connected to an electronic device with two conductors or channels, it is anticipated that any number of conductors may be used to connect an accessory to an electronic device and the method of detection described herein may be adapted to meet requirements of a varying number of conductors. At a step 1104 an electronic device monitors its one or more inputs for an input signal. In one embodiment the inputs are receiving no signal or a zero voltage level when an accessory is not attached. As described above, the electronic device may be configured to communicate with an accessory over one or more conductors. To properly interact with the various different types of accessories it is desired to detect the type or category of accessory that is attached.

At a step 1106 the electronic device detects a signal on one or more of its inputs. Any type signal may be detected. In the method of FIG. 11 the signals comprise DC voltage levels. Thereafter, at a step 1108 the electronic device analyzes the signals. Any type analysis may be performed. In one embodiment the analysis comprises comparison of the signals to data stored in memory for a matching signal pattern. In another embodiment the analysis comprises presenting the signals on the one or more inputs to a logic network.

Based on the analysis of step 1108, the operation advances to decision step 1112. At decision step 1112, the operation determines if the first channel is high, i.e. presented with a voltage level, and the second channel is low, i.e. presented with no voltage. If decision step 1112 determines that the first channel is high and the second channel is low then the operation advances to step 1116. At step 1116 the operation determines that a first accessory type has been detected. Because a first accessory type has been detected the operation advances to step 1118 wherein the electronic device prepares to interface with an accessory qualifying as a first accessory type. It is assumed that accessories falling into the category of a first accessory type share some similar interface routines. In one embodiment the electronic device loads control data that correspond to the first accessory type to guide or control interface with the accessory.

Alternatively, if at decision step 1112 a match is not found, then the operation advances to a decision step 1120. At decision step 1120 the operation determines if the first channel is low while the second channel is high. If the first channel is low while the second channel is high, then the operation advances to a step 1124. At step 1124 the operation determines that a second accessory type is connected to the electronic device. At step 1128 the electronic device prepares for interaction with the accessory, which was determined to be the second accessory type. In one embodiment this comprises loading control data that corresponds to the second accessory type. It is contemplated that any action may be taken. In the embodiment shown in FIG. 11 the first accessory types and the second accessory types do not include a memory that is configured to stored control data. As a result, interaction with first accessory types and second accessory types may involve use of control data stored on the electronic device. The control data may comprise interaction routines.

If a match does not occur at step 1120 the operation advances to a decision step 1132. At decision step 1132 the operation determines if the first channel is high and the second channel is high. If the first channel is high while the second channel is high, then the operation advances to a step 1136. At step 1136 the operation determines that a third accessory type is connected to the electronic device. At step 1140 the electronic device prepares for interaction with the accessory, which was determined to be the third accessory type. In one embodiment this comprises reading data from the accessory memory, such as a control data version ID. It is contemplated that any action may be taken. One such action may comprise initiating the operation illustrated in FIG. 6 or 8.

It will be understood that the above described arrangements of apparatus and the methods derived therefrom are merely illustrative of applications of the principles of this invention and many other embodiments and modifications may be made without departing from the spirit and scope of the invention as defined in the claims.

We claim:

1. An accessory and a wireless communication device configured to detect the type of accessory connected to the wireless communication device comprising:
   an accessory comprising:
      two or more outputs configured to connect to the wireless communication device;
      a signal source configured to connect to at least one of the two or more outputs, the two or more outputs arranged to generate a line voltage pattern; and
      a memory configured to store more than about 1 kilobits of predefined control data, the control data including software code, software patches, or software updates;
   a wireless communication device comprising:
      two or more inputs configured to receive the line voltage pattern from the accessory;
      a processor configured to:
         analyze the line voltage pattern to determine a type of accessory connected to the wireless communication device;
         initiate accessory interaction based on the analysis; and
         use the control data to operate the accessory.

2. The accessory and wireless communication device of claim 1, wherein the accessory further includes memory and wherein the processor is further configured to read data from the memory in the accessory.

3. The accessory and wireless communication device of claim 1, wherein the accessory comprises a hands-free system.

4. The accessory and wireless communication device of claim 1, wherein the line voltage pattern comprise DC voltage levels.

5. The accessory and wireless communication device of claim 4, wherein the DC voltage levels comprise logic '1' values and logic '0' values.

6. The accessory and wireless communication device of claim 1, wherein the processor further operates the steps of:
determining that the accessory has the software code, the software update, or the software patch in the accessory memory; and
receiving the software code, the software update, or the software patch from the accessory.

7. The accessory and wireless communication device of claim 1, wherein the wireless communication device comprises a cellular telephone.

8. The accessory and wireless communication device of claim 1, wherein the accessory further includes a memory configured to store a control code, the memory accessible via the two or more outputs.

9. An accessory for use with a wireless communication device comprising:
two or more output terminals configured to connect to a communication device;
a power source connection configured to connect to a power source;
a memory configured to store more than about 1 kilobits of predefined control data, the control data being software code, software patches, or software updates;
a signal generator configured to obtain power from the power source connection and provide a signal on at least one of the two or more output terminals, the two or more outputs arranged to generate a line voltage pattern; and
wherein the accessory is (i) identified by the line voltage pattern, and (ii) the control data is transferable to the wireless communication device for operating the accessory by the wireless communication device.

10. The accessory of claim 9, wherein the power source connection is configured to connect to a 12 volt power supply.

11. The accessory of claim 9, wherein the signal generator is a semiconductor device configured to generate a DC signal.

12. The accessory of claim 9, further including a memory configured to store a control code, the memory accessible via the two or more output terminals.

13. A method for detecting a category of an accessory connected to a wireless communication device:
storing predefined control data in the accessory, the control data being software code, software patches, or software updates;
providing a wireless communication device with two or more inputs;
monitoring the two or more inputs for a line voltage pattern;
comparing the line voltage pattern to a predetermined pattern;
determining, responsive to the comparing, that the accessory has the software code, the software update, or the software patch in the accessory memory; and
transferring the control data to the wireless communications device for operating the accessory by the wireless communication device.

14. The method of claim 13, further including reading data from a memory located in the accessory and analyzing the data.

15. The method of claim 13, further including providing an accessory with two or more outputs and connecting two or more outputs of the accessory to the two or more inputs of the wireless communication device.

16. The method of claim 14, wherein the data comprises control data and the method further includes reading at least a portion of the control data from the memory in the accessory.

17. The method of claim 13, wherein one of the predetermined patterns comprise at least one input receiving a voltage and the remaining inputs receiving no voltage.

18. The method of claim 13, wherein the accessory comprises a speaker phone system and the wireless communication device comprises a wireless telephone.

19. The method of claim 13, further comprising reading accessory data stored in a memory on the accessory and initiating an accessory interaction operation based on the comparing.

20. The method of claim 19, wherein the accessory interaction comprises setting audio parameters.

21. The method of claim 19, wherein the accessory interaction comprises executing software code.

22. A method for initiating operation of an interface of a wireless communication device comprising:
providing a wireless communication device having two or more inputs;
monitoring the two or more inputs for a line voltage pattern;
detecting a line voltage pattern on the two or more inputs;
processing the line voltage pattern to determine that a connected accessory has a memory storing software, a software update, or a software patch;
comparing operation software in the communication device to the software, the software update, or the software patch stored in the accessory memory;
receiving, responsive to the comparing step, the software code, the software patch, or the software update; and
initiating an accessory interaction operation based on the processing and using software code, the software patch, or the software update to operate the accessory.

23. The method of claim 22, wherein the line voltage pattern comprises a DC signal.

24. The method of claim 22, wherein processing comprise comparing the signal to data stored in memory.

25. The method of claim 22, wherein processing comprises providing a signal to control logic, the control logic configured to determine an accessory type.

26. An apparatus for detecting a type of accessory connected to a wireless communication device, the apparatus comprising:
means for coupling to an accessory using at least two signal lines;
means for receiving a line voltage pattern from the accessory;
means for detecting the line voltage pattern from the accessory;
means for receiving operating software, a software update, or a software patch from the accessory; and
means for analyzing the line voltage pattern from the accessory; and
means for operating the received operating software, software update, or software patch for controlling the wireless communication device operation.

27. The apparatus of claim 26, further including means for retrieving data from the accessory.

28. The apparatus of claim 26, wherein the means for analyzing the line voltage pattern comprises means for determining which of the signal lines is receiving an electrical signal.

* * * * *

UNITED STATES PATENT AND TRADEMARK OFFICE
CERTIFICATE OF CORRECTION

PATENT NO. : 7,024,230 B2 Page 1 of 1
APPLICATION NO. : 10/080425
DATED : April 4, 2006
INVENTOR(S) : Troy Curtiss and Brad Lemley It is certified that error appears in the above-identified patent and that said Letters Patent is hereby corrected as shown below:

Title page,
Item [73] should read:

-- [73] Assignee: Kyocera Wireless Corp., San Diego, CA (US) --

Signed and Sealed this

Third Day of July, 2007

JON W. DUDAS
*Director of the United States Patent and Trademark Office*